Nov. 23, 1954    J. G. BAKER    2,694,959
WIDE-ANGLE TELEPHOTO OBJECTIVE
Filed Oct. 13, 1947

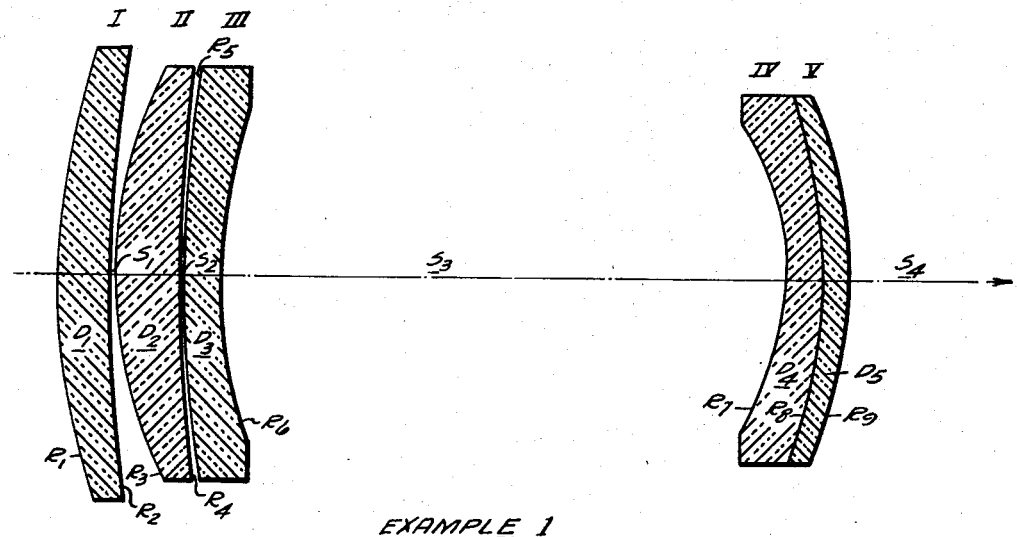

EXAMPLE 1
36 IN.  f/8

| ELEMENT | RADII (INCHES) | THICKNESS (INCHES) | SPACE (INCHES) | $N_D$ | ABBE-V |
|---|---|---|---|---|---|
| I | $R_1$ 9.405 $R_2$ 21.022 | $D_1$ .715 | | 1.5167 | 64.5 |
| | | | $S_1$ .036 | | |
| II | $R_3$ 5.956 $R_4$ 23.423 | $D_2$ .929 | | 1.5163 | 64.5 |
| | | | $S_2$ .037 | | |
| III | $R_5$ 20.662 $R_6$ 7.702 | $D_3$ .547 | | 1.7199 | 29.3 |
| | | | $S_3$ 7.747 | | |
| IV | $R_7$ -3.970 $R_8$ -8.018 | $D_4$ .500 | | 1.5163 | 64.5 |
| V | $R_9$ -6.253 | $D_5$ .377 | | 1.7199 | 29.3 |
| | | | $S_4$ 18.390 | | |

EXAMPLE 2
36 IN.  f/8

| ELEMENT | RADII (INCHES) | THICKNESS (INCHES) | SPACE (INCHES) | $N_D$ | ABBE-V |
|---|---|---|---|---|---|
| I | $R_1$ 9.405 $R_2$ 21.022 | $D_1$ .715 | | 1.517 | 64.5 |
| | | | $S_1$ .036 | | |
| II | $R_3$ 5.956 $R_4$ 24.680 | $D_2$ .929 | | 1.517 | 64.5 |
| | | | $S_2$ .055 | | |
| III | $R_5$ 21.345 $R_6$ 7.702 | $D_3$ .461 | | 1.72 | 29.3 |
| | | | $S_3$ 7.801 | | |
| IV | $R_7$ -4.001 $R_8$ -8.336 | $D_4$ .412 | | 1.517 | 64.5 |
| V | $R_9$ -6.326 | $D_5$ .549 | | 1.72 | 29.3 |
| | | | $S_4$ 18.637 | | |

INVENTOR.
JAMES G. BAKER
BY  Wade Kornty
ATTORNEY
H. N. Losch
AGENT

United States Patent Office 2,694,959
Patented Nov. 23, 1954

2,694,959

WIDE-ANGLE TELEPHOTO OBJECTIVE

James G. Baker, Waban, Mass., assignor to the United States of America as represented by the Secretary of War Application October 13, 1947, Serial No. 779,447

4 Claims. (Cl. 88—57)

The invention described herein may be manufactured and used by or for the Government for governmental purposes without the payment of any royalty thereon.

This invention relates to photographic objectives and more particularly to wide angle telephoto objectives.

The conditions of military aerial photographic reconnaissance are such that the practical use of telephoto lenses of great focal length has been seriously inhibited by the small angular field characteristic of such telephoto lenses, and by the repeated failure of reconnaissance aircraft to locate ground targets to the accuracy required. Moreover, increasing use of stereo-photography in aerial photographic work makes it desirable and indeed mandatory for best results to employ lenses of great focal length, large angular coverage, and high quality of resolution and contrast. The optical aberrations which adversely affect the image when certain limits of field angle are exceeded as the focal length is increased have heretofore been found so large in standard telephoto systems as to annul the advantages of the increase in focal length. The small field angle of the prior art telephoto objectives also restricts the number of pictures that can be taken and the actual surface photographed along the line of flight.

The present invention allows aerial photography to be carried out to obtain good image quality with little or no difficulty in that the telephoto objective of the instant invention covers a wide angle field of view which enables the camera operator to photograph a selected target without the tedious task of accurate aiming. A number of pictures can be taken using this lens system covering all the surface below in the line of flight of the photographic aircraft. The lens system is corrected for objectional spherical aberration, coma, and astigmatism and has a high degree of resolving power on a flat field.

It is an object of this invention to provide a wide angle telephoto objective capable of producing high resolving power.

It is another object of this invention to provide a wide angle telephoto objective that is exceptionally well corrected for spherical aberration, coma, astigmatism, and flatness of field.

It is a further object of this invention to provide a wide angle telephoto objective with an unusually small amount of vignetting to the edge of the desired field.

It is still a further object of this invention to provide a wide angle telephoto objective comprising an air-spaced front three-element convergent objective component consisting of two positive elements and a negative element in axial alignment with a diametrically smaller cemented doublet rear divergent component consisting of a positive element and a negative element in which the ratio of the front vertex of the front element and the rear focal plane to the equivalent focal length of the lens system is less than 83%.

These and other objects and advantages reside in certain novel features of construction, arrangement, and combination of parts as will hereinafter become more apparent as the description proceeds and as pointed out in the appended claims referring to the accompanying drawing.

Referring to the figure there is shown a lens system of five elements, enumerated I to V, inclusive, which includes a front three-element objective component consisting of two positive meniscus crown elements separated by a meniscus-shaped air lens in which the center is thinner than the edge, and a meniscus flint element air-spaced by another centrally thin meniscus air lens from the second positive element producing a condenser or convergent objective component of the lens system. Axially spaced from the front condenser or objective component is a rear member that consists of a cemented doublet of a negative crown element on the side of the objective component and a positive flint element on the side of the shorter conjugate. By slightly modifying the rear member the doublet elements could be air spaced although there would be some slight loss due to reflection. It may be noted that all the surfaces of the elements in the front objective component are convex with respect to the front of the system. The opposite surfaces of the rear member and the cemented surface thereof are concave toward the objective component or the front of the system. The two positive elements of the front objective component and the negative element of the rear doublet member have the same index of refraction; and the negative element of the front objective component and the positive element of the rear doublet member have the same refractive index although the latter condition might be effected with high index flint elements of unequal refractive index. By so arranging and by bending these elements as described below the telephoto lens system of a much larger angular field of view is possible without introducing objectionable optical aberrations. Actually, this lens system provides excellent image quality over a large image plane covering an exceptionally wide angle for a telephoto lens system. Particular attention has been paid to the correction of spherical aberration, coma, astigmatism, curvature of field and vignetting.

One embodiment of the invention is given in Example 1 below wherein the invention is set out by the table in which I, II, . . . represent the elements, $R_1$, $R_2$, . . . represent the radii of curvature of the various lens surfaces in inches counting from the front (the absence of a sign indicating that the surface is convex to the longer conjugate and the negative sign that it is concave thereto), $D_1$, $D_2$, . . . represent the axial thicknesses of the individual lens elements in inches, and $S_1$, $S_2$, . . . represent the axial air gaps between the lens elements in inches. The table also gives the refractive index $N_D$, and the dispersive index in Abbe-V numbers of the lens elements. The equivalent focal length is 36 inches and the relative aperture is f/8 for the telephoto objective described in this example.

*Example 1*

[36-inch    f/8]

| Element | Radii (inches) | Thickness (inches) | Space (inches) | $N_D$ | Abbe-V |
|---|---|---|---|---|---|
| I | $R_1$= 9.405 | $D_1$=.715 | | 1.5167 | 64.5 |
|   | $R_2$= 21.022 | | $S_1$= .036 | | |
| II | $R_3$= 5.956 | $D_2$=.929 | | 1.5163 | 64.5 |
|   | $R_4$= 23.423 | | $S_2$= .037 | | |
| III | $R_5$= 20.662 | $D_3$=.547 | | 1.7199 | 29.3 |
|   | $R_6$= 7.702 | | $S_3$= 7.747 | | |
| IV | $R_7$=− 3.970 | $D_4$=.500 | | 1.5163 | 64.5 |
|   | $R_8$=− 8.018 | | | | |
| V | | $D_5$=.377 | | 1.7199 | 29.3 |
|   | $R_9$=− 6.253 | | $S_4$=18.390 | | |

It may be seen that the telephoto effect in this example is good in that the ratio of the lens system effective length, including the focal plane, to the equivalent focal length provides a telephoto ratio of only 81.3 per cent.

Another example of the invention is described in the table under Example 2 given below in which the lens system is produced that provides slightly better resolving power in that chromatic aberrations are better corrected, particularly for lateral color. The telephoto objective lens system of Example 2, like Example 1, has an equivalent focal length of 36 inches and a relative aperture of f/8. The telephoto ratio of the telephoto objective lens system produced by Example 2 is only 82.2 per cent.

Example 2
[36-inch  f/8]

| Element | Radii (inches) | Thickness (inches) | Space (inches) | $N_D$ | Abbe-V |
|---|---|---|---|---|---|
| I | $R_1=$ 9.405 | $D_1=.715$ | | 1.517 | 64.5 |
| | $R_2=$ 21.022 | | $S_1=$ .036 | | |
| II | $R_3=$ 5.956 | $D_2=.929$ | | 1.517 | 64.5 |
| | $R_4=$ 24.680 | | $S_2=.055$ | | |
| III | $R_5=$ 21.345 | $D_3=.461$ | | 1.72 | 29.3 |
| | $R_6=$ 7.702 | | $S_3=$ 7.801 | | |
| IV | $R_7=-$ 4.001 | $D_4=.412$ | | 1.517 | 64.5 |
| | $R_8=-$ 8.336 | | | | |
| V | $R_9=-$ 6.326 | $D_5=.549$ | | 1.72 | 29.3 |
| | | | $S_4=18.637$ | | |

What I claim as my invention and desire to secure by Letters Patent is:

1. A wide angle telephoto objective lens system comprising; the combination of a front positive three-element component and a rear negative doublet component in axial alignment, said front positive component consisting of two positive elements and a negative element having all the surfaces thereof convex toward the longer conjugate and a focal point at a distance greater than the distance of said rear negative doublet component from said front positive component, and said rear doublet component consisting of a negative element and a positive element in contiguous relation having all the surfaces thereof concave toward the longer conjugate and a focal point forward of said front positive component wherein the second principal plane of the objective lens system is established in front of said front positive component and the rear principal focus of the objective lens system is established behind the rear negative component providing an equivalent focal length for the objective lens system greater than the length of the lens system including the rear principal focus for the objective lens system, the two positive elements in said front component and the negative element of said rear component each having substantially the same refractive index and the same dispersive index respectively and the negative element of said front component and the positive element of said rear doublet component each having substantially the same refractive index and the same dispersive index respectively, the refractive index of each of the last-mentioned two elements exceeding the refractive index of each of the two positive elements of the front component and the negative element of the rear doublet component by more than .2 and the dispersive index of each of said last three elements exceeding the dispersive index of each of the negative elements of the front component and the positive element of the rear doublet component by more than 30 whereby the objective lens system length comprising the distance between the front vertex of the front positive component and the rear principal focus of the objective lens system is less than 82.5 per cent of the equivalent focal length comprising the distance between the second principal plane and the rear principal focus of the objective lens system, and the ratio of the equivalent focal length of the objective lens system is greater than 1.9 times the back focal length of the objective lens system comprising the distance between the rear vertex of the rear doublet component and the rear principal focus of the objective lens system to provide a wide field angle of high power.

2. A wide angle telephoto objective lens system comprising; a front three-element positive objective component consisting of two positive elements and one negative element axially arranged in the order named from the front of the system and being separated by centrally thin meniscus air lenses, all the surfaces of said positive and negative elements being convex toward the longer conjugate, the index of refraction of said negative element exceeding the index of refraction of said positive elements by more than .2, and the dispersive index of each of said positive elements exceeding the dispersive index of said negative element by more than 30, said three elements having a focal point on the side of the shorter conjugate; and a rear negative doublet member consisting of a negative element and a positive element arranged in the order named with a common surface therebetween in axial alignment and axially spaced from said front positive objective component on the side of the shorter conjugate a distance within the focal distance of the front objective component greater than $\frac{1}{5}$ and less than $\frac{1}{4}$ the equivalent focal length of the object lens system, all the surfaces of said last mentioned elements including said common surface being convex toward the shorter conjugate of the object lens system, the index of refraction and the dispersive index of said negative element thereof being substantially equal to the index of refraction and the dispersive index respectively of said two positive elements in said front objective component and the index of refraction and the dispersive index of said positive element in said doublet member being substantially equal to the index of refraction and the dispersive index respectively of said negative element in said front objective component, the focal point of said doublet member lying forward of said objective component whereby the second principal plane of the objective lens system is established in front of the front objective component and the principal focus of the objective lens system is established behind the doublet member such that the distance from the front vertex of the front objective component to the principal focus of the objective lens system is less than 82.5 per cent of the equivalent focal length of the objective lens system, and the equivalent focal length of the objective lens system is greater than 1.9 times the back focal length of the objective lens system to provide a wide angle field of view.

3. In a telephoto objective having numerical data substantially as set forth in the following table where $R_1$, $R_2$, . . . represent a radii of curvature of the surfaces in inches, $D_1$, $D_2$, . . . represent the axial thicknesses of the elements in inches, and $S_1$, $S_2$, . . . represent the axial air separations in inches for a focal length $F=36$:

| Radii | Thickness | Space | $N_D$ | Abbe-V |
|---|---|---|---|---|
| $R_1=$ 9.405 | $D_1=.715$ | | 1.5167 | 64.5 |
| $R_2=$ 21.022 | | $S_1=$ .036 | | |
| $R_3=$ 5.956 | $D_2=.929$ | | 1.5163 | 64.5 |
| $R_4=$ 23.423 | | $S_2=$ .037 | | |
| $R_5=$ 20.662 | $D_3=.547$ | | 1.7199 | 29.3 |
| $R_6=$ 7.702 | | $S_3=$ 7.747 | | |
| $R_7=-$ 3.970 | $D_4=.500$ | | 1.5163 | 64.5 |
| $R_8=-$ 8.018 | $D_5=.377$ | | 1.7199 | 29.3 |
| $R_9=-$ 6.253 | | $S_4=18.390$ | | |

4. In a telephoto objective having numerical data substantially as set forth in the following table where $R_1$, $R_2$, . . . represent a radii of curvature of the surfaces in inches, $D_1$, $D_2$, . . . represent the axial thicknesses of the elements in inches, and $S_1$, $S_2$, . . . represent the axial air separations in inches for a focal length $F=36$:

| Radii | Thickness | Space | $N_D$ | Abbe-V |
|---|---|---|---|---|
| $R_1=$ 9.405 | $D_1=.715$ | | 1.517 | 64.5 |
| $R_2=$ 21.022 | | $S_1=$ .036 | | |
| $R_3=$ 5.956 | $D_2=.929$ | | 1.517 | 64.5 |
| $R_4=$ 24.680 | | $S_2=$ .055 | | |
| $R_5=$ 21.345 | $D_3=.461$ | | 1.72 | 29.3 |
| $R_6=$ 7.702 | | $S_3=$ 7.801 | | |
| $R_7=-$ 4.001 | $D_4=.412$ | | 1.517 | 64.5 |
| $R_8=-$ 8.336 | $D_5=.549$ | | 1.72 | 29.3 |
| $R_9=-$ 6.326 | | $S_4=18.637$ | | |

(References on following page)

References Cited in the file of this patent

UNITED STATES PATENTS

| Number | Name | Date |
|---|---|---|
| 2,321,973 | Bennett | June 15, 1943 |
| 2,378,170 | Aklin | June 12, 1945 |
| 2,390,387 | Rayton et al. | Dec. 4, 1945 |

FOREIGN PATENTS

| Number | Country | Date |
|---|---|---|
| 222,709 | Great Britain | Oct. 9, 1924 |
| 487,271 | Germany | Dec. 11, 1929 |